United States Patent
Hirasaka et al.

(10) Patent No.: US 6,519,111 B2
(45) Date of Patent: Feb. 11, 2003

(54) DISK DRIVE APPARATUS, HARD DISK DRIVE, FILTER, AND METHOD FOR INSPECTING DISK DRIVE APPARATUS

(75) Inventors: Yoshihiro Hirasaka, Sagamihara (JP); Ichiroh Koyanagi, Yokohama (JP); Kohichi Takeuchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/998,505

(22) Filed: Nov. 30, 2001

(65) Prior Publication Data

US 2002/0063990 A1 May 30, 2002

(30) Foreign Application Priority Data

Nov. 30, 2000 (JP) ........................................ 2000-365850

(51) Int. Cl.[7] .............................................. G11B 33/14
(52) U.S. Cl. .................................................... 360/97.02
(58) Field of Search ............................ 360/97.02–97.04

(56) References Cited

U.S. PATENT DOCUMENTS

| | | | | |
|---|---|---|---|---|
| 6,144,522 A | * | 11/2000 | Myokan et al. | 360/97.02 |
| 6,214,070 B1 | * | 4/2001 | Crowder et al. | 360/97.02 |
| 6,238,467 B1 | * | 5/2001 | Azarian et al. | 360/97.02 |
| 6,296,691 B1 | * | 10/2001 | Gidumal | 360/97.02 |
| 6,395,073 B1 | * | 5/2002 | Dauber | 360/97.02 |

* cited by examiner

*Primary Examiner*—Allen Cao
(74) *Attorney, Agent, or Firm*—Robert B. Martin; Bracewell & Patterson, L.L.P.

(57) ABSTRACT

A disk drive apparatus is constructed with a filter attached to an enclosure through a through hole formed in the enclosure. A special positioning operation is eliminated by inserting the filter into the through hole because a portion of the filter is exposed to the outside through the enclosure. The disk drive apparatus can be constructed so that the filter is supported on the enclosure. In this case, the enclosure has a chamfered portion around the circumference of the through hole; the filter has a flange corresponding to the chamfered portion; and the flange is brought into contact with the chamfered portion. The filter can be fixed to the enclosure by sticking adhesive tape on a circumference of the flange and a circumference of the chamfered portion of the enclosure. Adhesive residue is eliminated because the fixation of the filter is performed with single-coated tape.

3 Claims, 10 Drawing Sheets

[Figure 1]
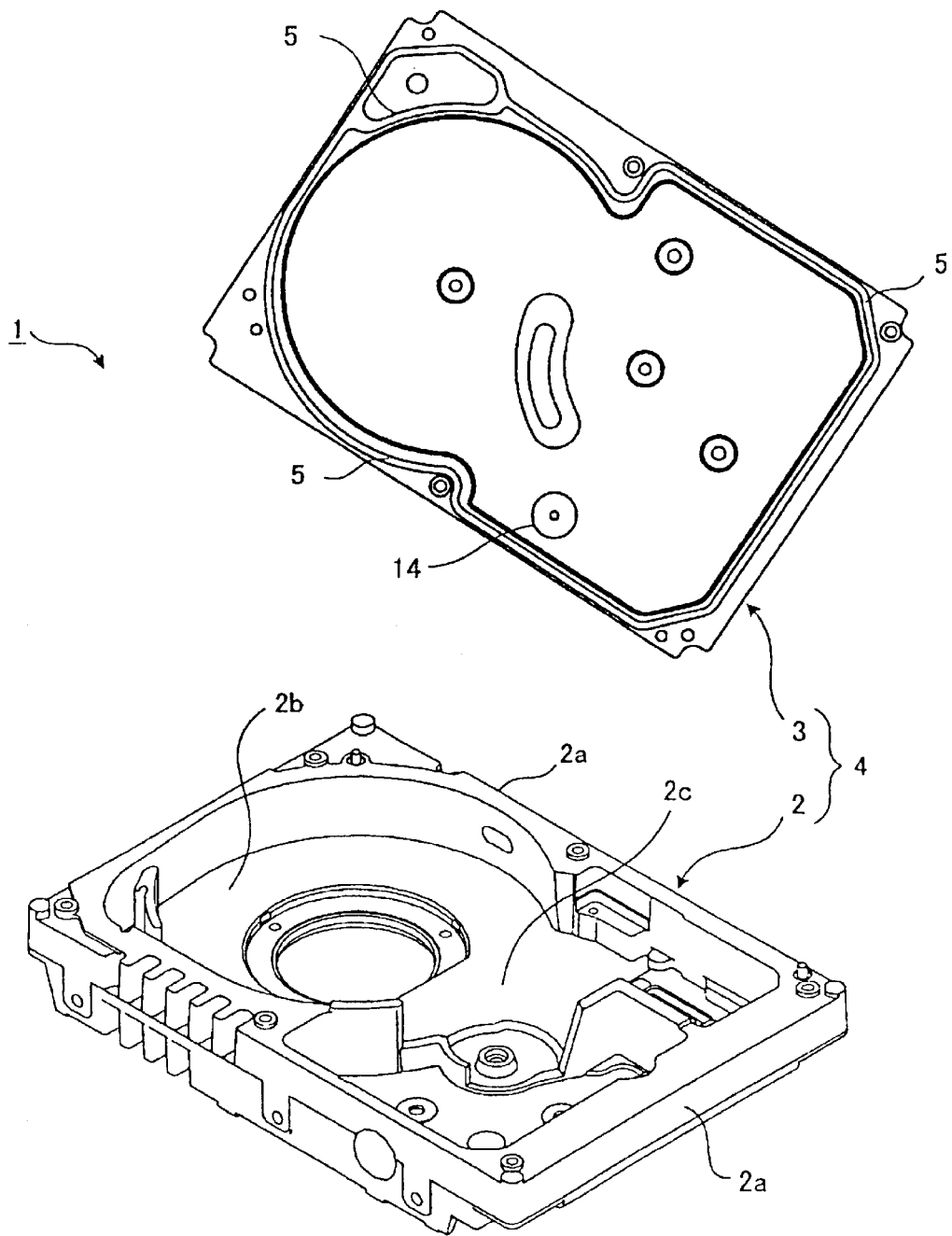

[Figure 2]
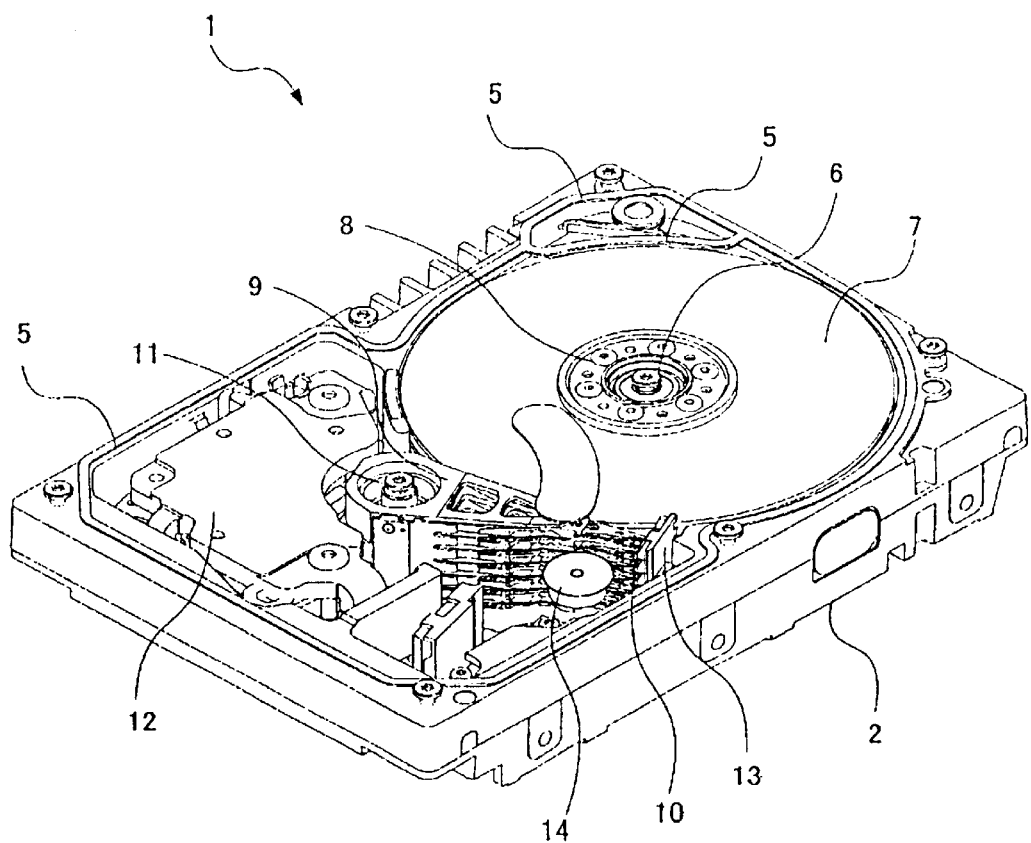

[Figure 3]
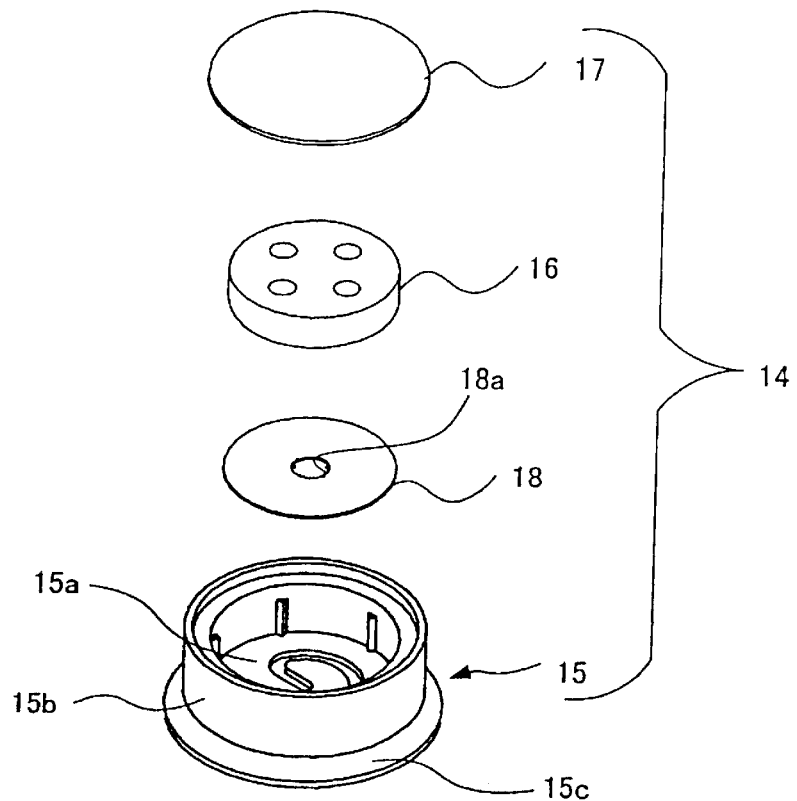
[Figure 4]
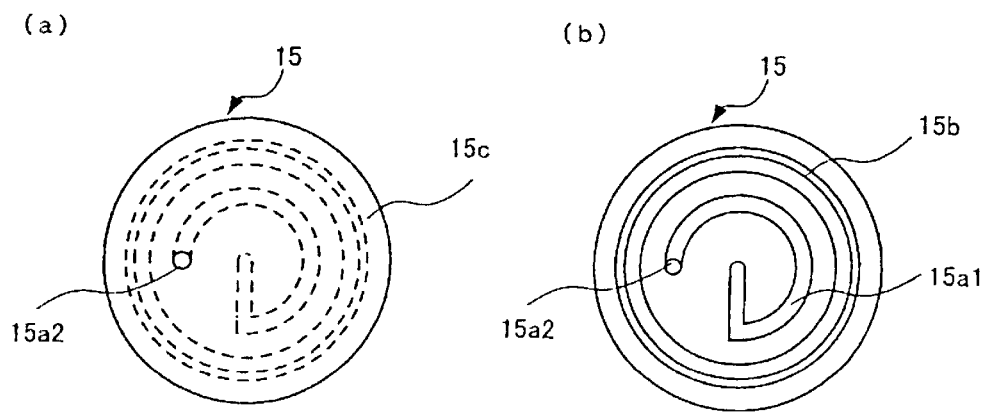

[Figure 5]
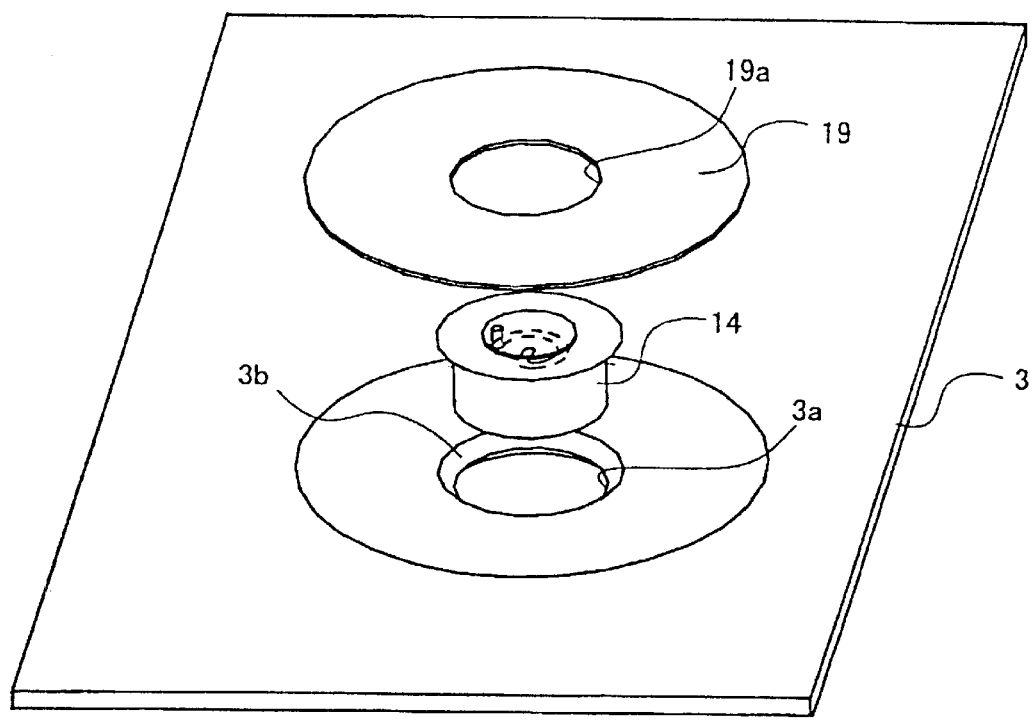

[Figure 6]
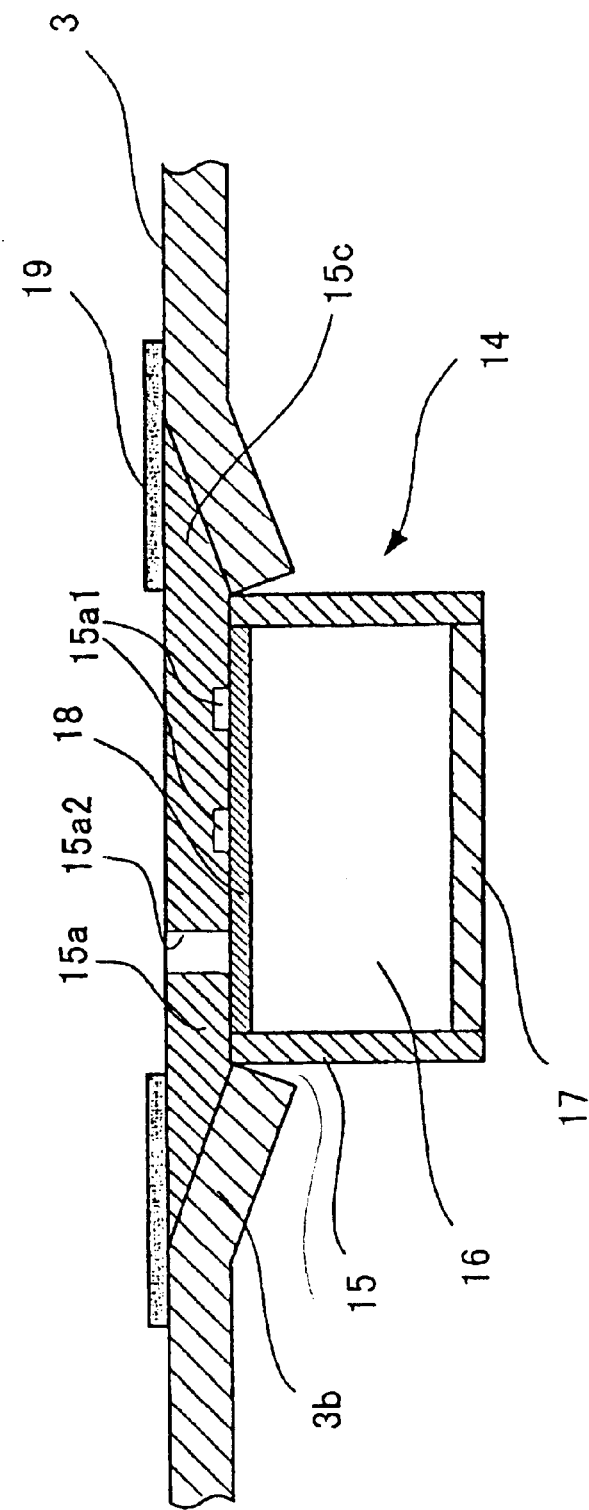

[Figure 7]
(Prior Art)
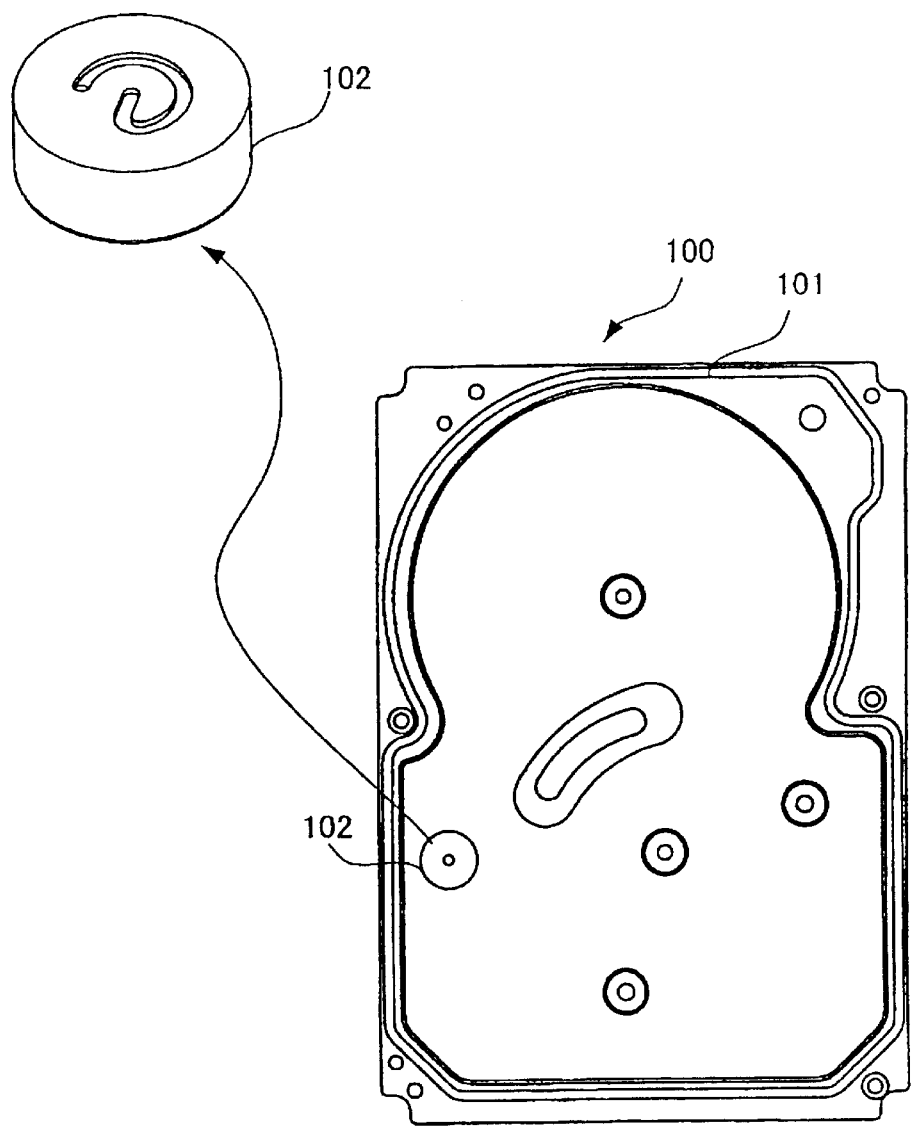

[Figure 8]
(Prior Art)
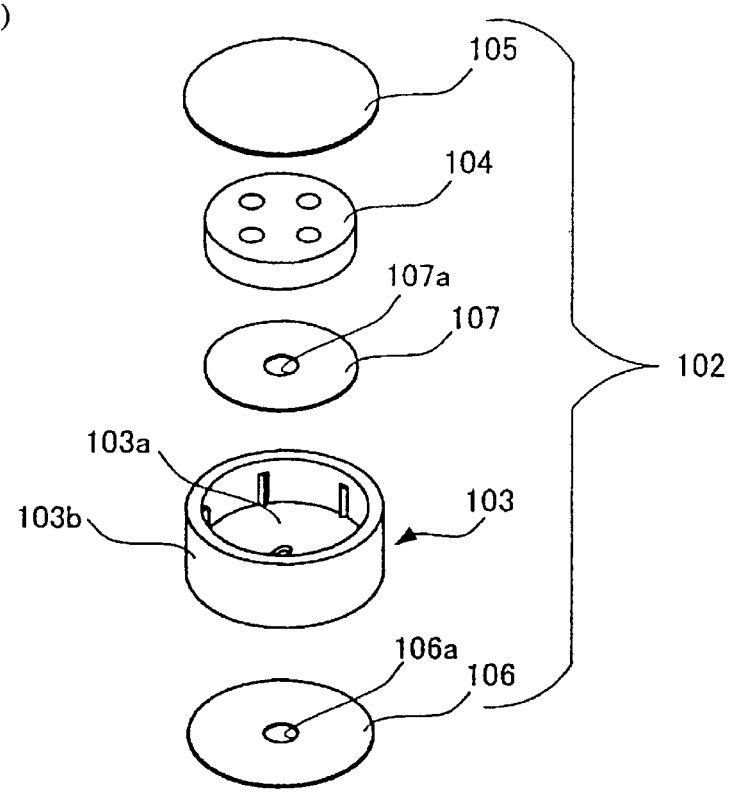
[Figure 9]
(Prior Art)
(a)                                           (b)
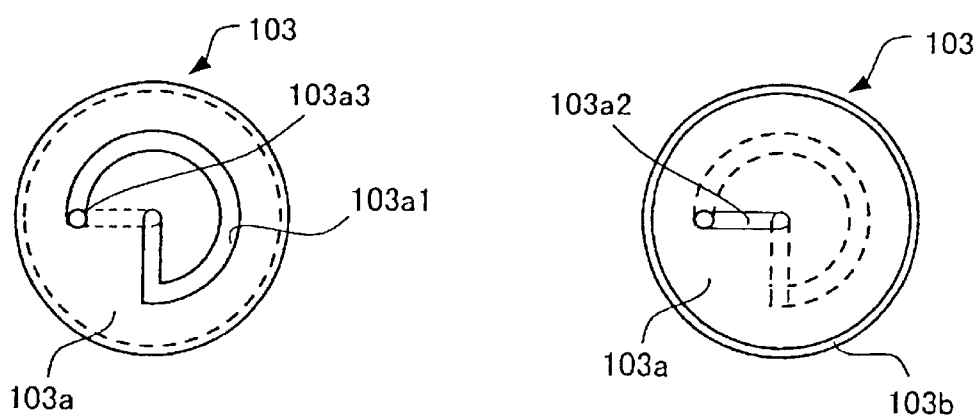

[Figure 10]
(Prior Art)
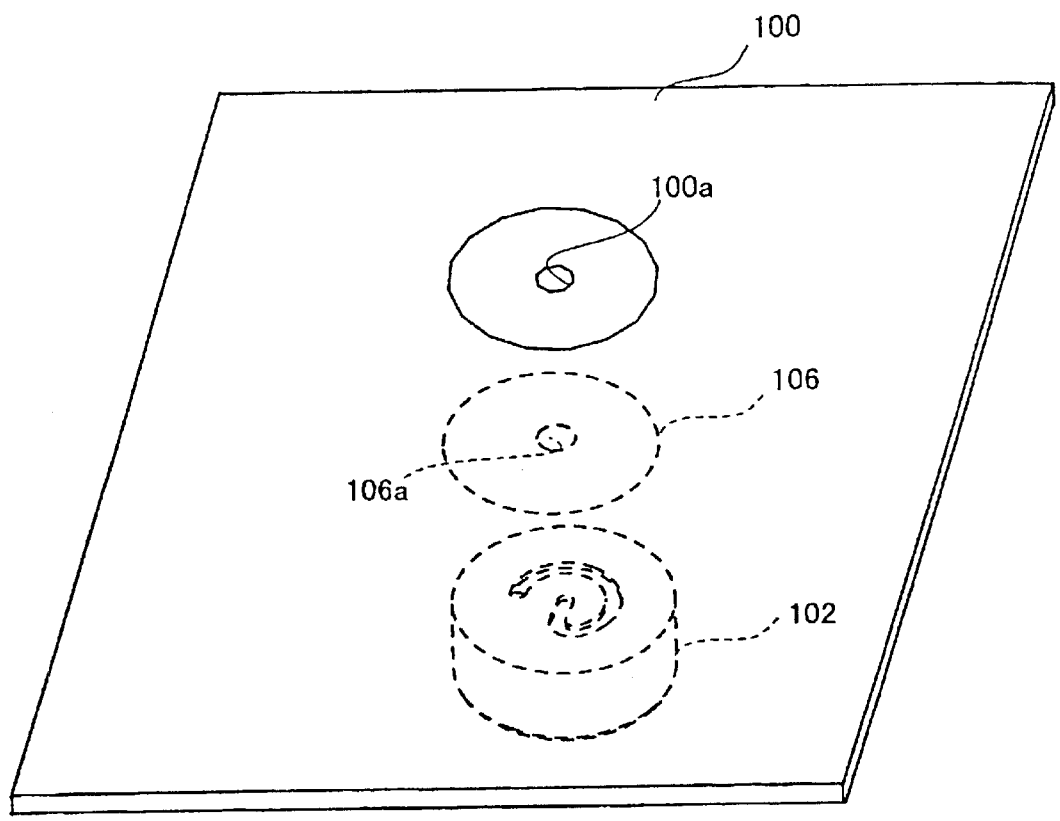

[Figure 11]
(Prior Art)
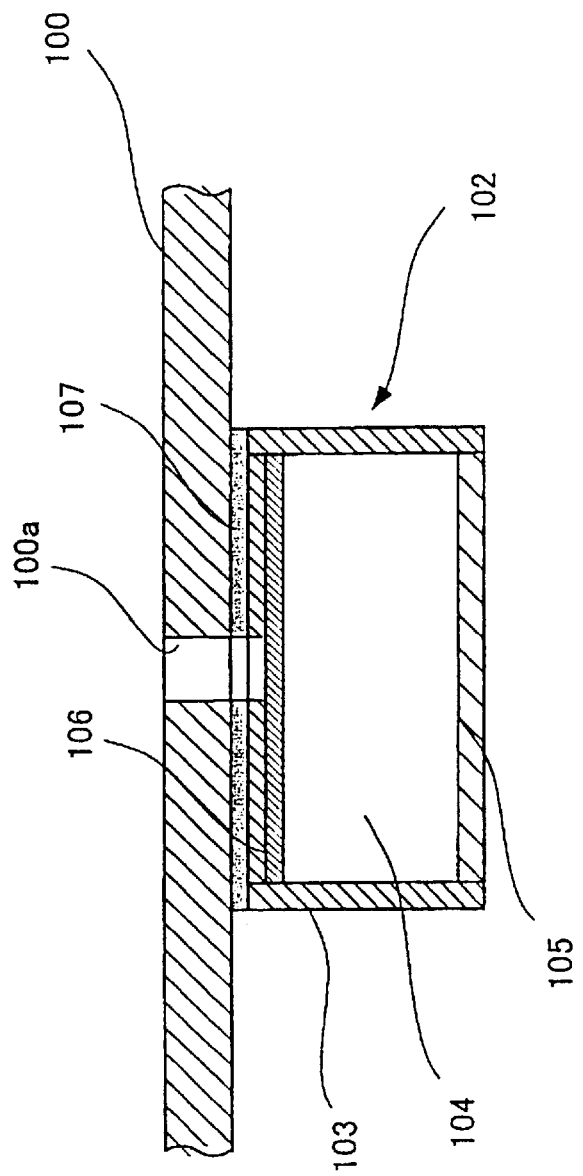

[Figure 12]
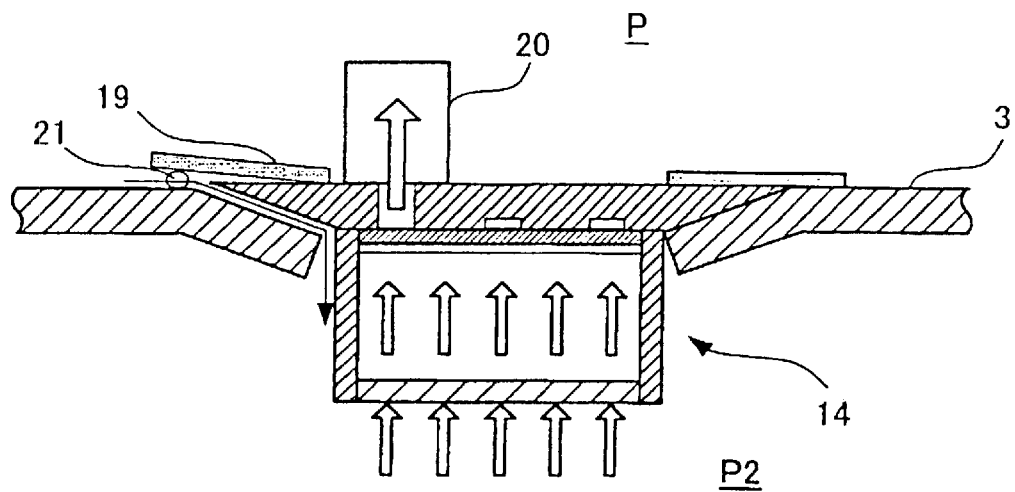
[Figure 13]
(Prior Art)
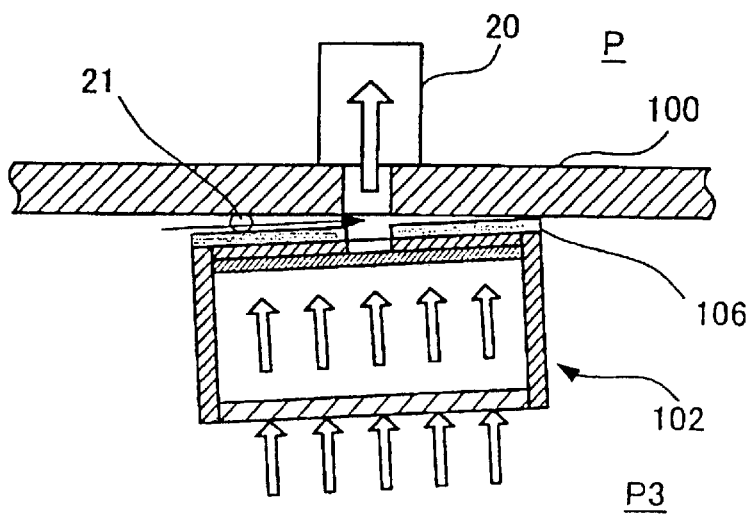

DISK DRIVE APPARATUS, HARD DISK DRIVE, FILTER, AND METHOD FOR INSPECTING DISK DRIVE APPARATUS

This application claims the priority benefit of Japanese Patent Application No. 2000-365850, filed on Nov. 30, 2000, and entitled "Disk Drive Apparatus, Hard Disk Drive, Filter and Method for Inspecting Disk Drive Apparatus."

BACKGROUND OF THE INVENTION

1. Technical Field

The present invention relates to a disk drive apparatus such as a hard disk drive, and more particularly to a filter attaching structure for preventing the entrance of dust into the disk drive apparatus.

2. Description of the Related Art

The most commonly used hard disk drive (hereinafter referred to as a HDD) as data storage means for computers has structure in which a single or plurality of magnetic disks are disposed coaxially and driven by a spindle motor. Data reading and writing are done by magnetic heads provided in opposition to the magnetic disks. The magnetic heads are driven by an actuator (generally, by a voice coil motor (hereinafter referred to as a VCM)). The magnetic disks, the magnetic heads, and the actuator are stored in a case called a disk enclosure. The disk enclosure is constructed of an aluminum alloy base in the form of a thin box, and a top cover for scaling an opening of the base. A gasket is provided on the circumference of a surface of the top cover opposed to the base. The base and the top cover are assembled so that the gasket is pressed against the top face of the circumferential wall of the base. In this manner, the disk enclosure is hermetically sealed.

The temperature within the disk enclosure rises due to the influence of the high rotational speed of magnetic disks, etc. Here, assume that the air within the disk enclosure expands with a rise in temperature and leaks from the gasket to the outside. There is a possibility that if the temperature within the disk enclosure falls, the air within the disk enclosure will shrink and therefore air will enter the disk enclosure from the outside. At this time, if dust and evaporated organic or inorganic substance, contained in the entering air, get into the disk enclosure, the magnetic head will crash against the dust or the organic or inorganic substance solidified on the disk surface during use of HDD, which will destroy the magnetic head or the magnetic disk. To prevent the entrance of dust into the disk enclosure, the HDD has a filter provided on the top cover or base. This filter is called a breather filter. This breather filter becomes a flow passage in which the circulation between the internal air and the external air is created by the expansion and contraction of the air within the disk enclosure due to temperature rise and fall. The breather filter is used to reduce the entrance of dust or evaporated organic or inorganic substance from the outside, to the degree that device performance is not affected.

A conventional breather filter will be described with reference to the drawings. FIG. 7 is a plan view showing the lower surface of a top cover 100. In the top cover 100, the upper surface means a surface that is exposed to the outside when the disk enclosure is constructed, while the lower surface means a surface that faces the disk enclosure in opposition to the base. A gasket 101 is stuck on the circumference of the lower surface of the top cover 100 so that the disk enclosure is hermetically sealed. In addition, a breather filter 102 is stuck on the lower surface of the top cover 100 by adhesive double-coated tape. FIG. 7 also shows a perspective view of the breather filter 102. Note that in the breather filter 102 shown in FIG. 7, a surface on which the top cover 100 is stuck is upward.

FIG. 8 is an exploded perspective view of the breather filter 102. In the figure, a surface that is stuck on the top cover 100 is downward. As illustrated in FIG. 8, the breather filter 102 is constructed mainly of a filter case 103, a filter main body 104 to be housed in the filter case 103, and an air vent film 105 for covering the upper surface of the filter main body 104. FIG. 9 shows the upper surface (FIG. 9A) and lower surface (FIG. 9B) of the filter case 103.

In FIGS. 8 and 9, the filter case 103 is constructed of a circular bottom wall 103a, and a circumferential wall 103b extending upward from the circumference of the bottom wall 103a. The upper surface of the bottom wall 103a has an air vent groove 103a1, while the lower surface has an air vent groove 103a2. Note that the upper surface of the bottom wall 103a in the filter case 103 refers to a lower surface in FIG. 8, while the lower surface refers to an upper surface in FIG. 8. The air vent groove 103a1 formed in the upper surface of the bottom wall 103a is a circular arc groove with the center of the bottom wall 103a as its starting point and an air vent hole 103a3 passing through the bottom wall 103a as its terminating point. The air vent groove 103a2 formed in the lower surface of the bottom wall 103a has an air vent hole 103a3 as its starting point and the center of the bottom wall 103a as its terminating point. Thus, the air vent groove 103a1 and the air vent groove 103a2 are communicated with each other through the air vent hole 103a3.

Adhesive double-coated tape 106 is bonded on the upper surface of the bottom wall 103a of the filter case 103, and adhesive double-coated tape 107 is bonded on the lower surface. Therefore, the air vent groove 103a1 forms a closed space between itself and the adhesive double-coated tape 106. Similarly, the air vent groove 103a2 forms a closed space between itself and the adhesive double-coated tape 107. However, since through holes 106a and 107a are formed in the centers of the adhesive double-coated tapes 106 and 107, as shown in FIG. 8, portions corresponding to the through holes are in communication with the outside.

The filter main body 104 is housed within the filter case 103. When this occurs, the filter main body 104 is bonded and fixed by the adhesive double-coated tape 107 bonded on the lower surface of the bottom wall 103a. Then, the air vent film 105 is stuck on the upper surface (in FIG. 8) of the filter main body 104. In this manner, the components are integrated into the breather filter 102. The adhesive double-coated tape 107 bonded on the upper surface of the bottom wall 103a bonds the breather filter 102 on the top cover 100. This state is shown in FIGS. 10 and 11. That is, the centers of the through hole 100a formed in the top cover 100, the through hole 106a of the adhesive double-coated tape 106, and the breather filter 102 are aligned with one another, and the breather filter 102 is fixed to the top cover 100 by the adhesive double-coated tape 106.

When the air within the disk enclosure expands, air will flow out to the outside through the following path. That is, the air within the disk enclosure passes through the air vent film 105, the filter main body 104, the through hole 107a of the adhesive double-coated tape 107, the air vent groove 103a2, the air vent hole 103a3, the air vent groove 103a1, the through hole 106a of the adhesive double-coated tape 106, and the through hole 100a of the top cover 100 in the recited order and flows out to the outside. On the other hand, when the outside air flows into the disk enclosure because of a fall in the temperature within the disk enclosure, the outside air passes through the through hole 100a of the top cover 100, the through hole 106a of the adhesive double-coated tape 106, the air vent groove 103a1, the air vent hole 103a3, the air vent groove 103a2, the through hole 107a of the adhesive double-coated tape 107, the filter main body 104, and the air vent film 105 in the recited order. Therefore, even if the entering air contains dust or an evaporated organic or inorganic substance, the entrance of dust into the disk enclosure can be reduced to the degree that device performance is not affected, because the air passes through the filter main body 104 and air vent film 105 which have activated charcoal as their main component.

3. Problems to Be Solved by the Invention

In the conventional breather filter 102 described above, the step of sticking the filter on the top cover 100 requires the positioning operation of aligning the through hole 100a of the top cover 100 with the center of the breather filter 102. The positioning operation is manually performed and therefore the labor of the operation is desired to be alleviated.

In addition, in the case of disassembling the assembled HDD and cleaning the top cover 100, it is necessary to remove the breather filter 102 from the top cover 100. When removing the breather filter 102 from the top cover 100, the adhesive agent of the adhesive double-coated tape 106 will remain on the top cover 100 or breather filter 102. Therefore, if the adhesive agent is not removed, the top cover 100 or breather filter 102 cannot be reused. Particularly, since the breather filter 102 is small in size, the operation of removing the adhesive agent is not easy. If the cost for manufacturing the breather filter 102 is compared with the cost required for the adhesive-agent removing operation, it is difficult to reuse the breather filter 102 on which the adhesive agent has remained. Therefore, in the case where the adhesive agent remains on the breather filter 102, there are cases where the use of a new breather filter 102 results in reduced cost. When employing a new breather filter 102, the operation of positioning the adhesive double-coated tape 106 with respect to the breather filter 102 becomes necessary.

In view of the points described above, an object of the present invention is to alleviate the labor of the positioning operation when attaching the breather filter to the top cover. Another object of the invention is to prevent the residue of the adhesive agent when removing the breather filter from the top cover.

SUMMARY OF THE INVENTION

The aforementioned conventional filter requires a troublesome positioning operation, because the breather filter is fixed to the lower surface of the top cover by the use of adhesive double-coated tape. Hence, the present invention eliminates the troublesome positioning operation by forming a through hole in the top cover and inserting the breather filer into the hole. In addition, the top cover can be fixed by employing adhesive single-coated tape.

The disk drive apparatus of the present invention is constructed so that the filter is attached to the enclosure through the through hole formed in the enclosure. Consequently, a special positioning operation can be eliminated only by inserting the filter into the through hole. More specifically, the conventional structure requires the operation of positioning the through hole of the tope cover with respect to the center of the breather filter, whereas the present invention eliminates the conventional positioning operation because a portion of the filter is exposed to the outside through the enclosure.

The disk drive apparatus of the present invention can be constructed so that the filter is supported on the enclosure. In this case, the enclosure has a chamfered portion around the circumference of the through hole; the filter has a flange corresponding to the chamfered portion; and the flange is brought into contact with the chamfered portion. And in the case of adopting the construction, the filter can be fixed to the enclosure by sticking adhesive tape on a circumference of the flange and a circumference of the chamfered portion of the enclosure. Therefore the problem of the residue of an adhesive caused conventionally by adhesive double-coated tape can be eliminated, because the fixation of the filter is performed with adhesive single-coated tape.

However, the filter fixing structure in the present invention is not limited to the case mentioned above. The fixation can also be performed only with adhesive tape, without forming a chamfered portion in the enclosure and a flange in the filter. In addition, in the present invention, a position at which the filter is provided is arbitrary. For example, the enclosure of a HDD is usually constructed of a top cover and a base, and in that case, the filter may be provided on either the top cover or the base.

In accordance with the present invention, there is provided a hard disk drive comprising: a magnetic disk for magnetically storing data; a spindle motor for spinning the magnetic disk; a rotary actuator rotatable around a pivot having a magnetic head for reading out or writing data from or to the magnetic disk, for locating the magnetic head over a desired track on the magnetic disk; a disk enclosure, including a box-shaped base with a hole and a cover for sealing the hole, for housing the magnetic disk, the spindle motor, and the rotary actuator; and a breather filter disposed so that it penetrates the cover.

In the hard disk drive of the present invention, the breather filter is disposed to penetrate the cover constituting the disk enclosure. Consequently, the present invention eliminates the conventional operation of positioning the through hole of the cover with respect to the center of the breather filter because the breather filter can be exposed to the outside through the cover.

Preferred forms of the hard disk drive of the present invention are as follows. The cover has a through hole which the breather filter penetrates, and an inclined surface which is provided in circumference of the cover and inclines toward the through hole. Also, the breather filter is a cylindrical breather filter having at one end surface thereof a stopper pawl which abuts the inclined surface. In addition, the breather filter penetrates the through hole of the cover so that the stopper pawl is held on the inclined surface. According to this form, there is no possibility that the breather filter will fall into the disk enclosure, because the breather filter is supported mechanically on the top cover. In addition, the stopper pawl of the breather filter abuts the inclined surface, so that the surface of the top cover can be prevented from becoming uneven.

In the hard disk drive of the present invention, one end surface of the breather filter is exposed to the outside through the cover and the remaining portion is positioned within the disk enclosure. Consequently, the breather filter can be removed with the disk enclosure constructed. On the other hand, in the conventional breather filter, the entire filter is disposed within the enclosure, so the top cover and the base must be separated in order to remove the breather filter.

In the hard disk drive of the present invention, the one end surface of the breather filter has an air vent hole through which the air within the disk enclosure or the outside air is discharged or introduced; and the breather filter, excluding the air vent hole, is applied by adhesive tape from the circumference side of the cover. Since the adhesive tape in this case is adhesive single-coated tape, the problem of the residue of the adhesive agent can be avoided in removing the breather filter from the top cover.

In accordance with the present invention, there is provided a filter for preventing the entrance of dust into a disk drive apparatus, comprising: a filter main body for filtering the dust; and a filter case with a portion for housing the filter main body; wherein the filter case includes a bottom wall, a side wall extending upward from a circumference of the bottom wall, and a flange formed on a circumference of the bottom wall, the housing portion being formed by the bottom wall and the side wall.

When the filter of the present invention is attached to the enclosure through the through hole formed in the enclosure of the disk drive apparatus, the flange can be held on the enclosure portion around the through hole.

In the filter of the present invention, wherein a path for circulating air is formed in a surface of the bottom wall which faces the housing portion, the path being constructed of a groove extending from the circumference of the bottom wall toward the center of the bottom wall. When air flows into the disk drive apparatus, the air circulates from the circumferential side to the center and then reaches the filter main body. In addition, the bottom wall is able to have an air vent hole, which penetrates the bottom wall and reaches the circulation path on the circumferential side.

In the disk drive according to the present invention, whether or not the filter is appropriately attached to the enclosure can be determined by measuring the pressure within the enclosure. Furthermore, in accordance with the present invention, there is provided a method for inspecting a disk drive apparatus equipped with a disk medium for storing data, an enclosure for housing a head for reading out or writing data from or to the disk medium, and a filter attached via a through hole provided in the enclosure. In summary, the method comprises the steps of: pressurizing or decompressing the enclosure through the filter, measuring pressure within the enclosure, and judging, based on a value of the measured pressure, whether or not the filter has been appropriately attached.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a perspective view of a configuration of a disk enclosure constituting the HDD of this embodiment;

FIG. 2 is a perspective view of the interior of the HDD of this embodiment;

FIG. 3 is an exploded perspective view of a breather filter of this embodiment;

FIG. 4A is a plan view showing an upper surface of a filter case constituting the breather filter of this embodiment;

FIG. 4B is a plan view showing a lower surface of the filter case constituting the breather filter of this embodiment;

FIG. 5 is a part-perspective view showing how the breather filter is attached to the top cover in accordance with this embodiment;

FIG. 6 is a part-sectional view showing the state in which the breather filter is attached to the top cover in accordance with this embodiment;

FIG. 7 is a plan view showing the lower surface of a conventional top cover;

FIG. 8 is an exploded perspective view showing a conventional breather filter;

FIG. 9A is a plan view showing an upper surface of a filter case constituting the conventional breather filter;

FIG. 9B is a plan view showing a lower surface of the filter case constituting the conventional breather filter;

FIG. 10 is a part-sectional view showing the state in which the breather filter is attached to the conventional top cover;

FIG. 11 is a part-sectional view showing the conventional top cover;

FIG. 12 is a diagram for explaining an adhesive test for the breather filter of this embodiment; and FIG. 13 is a diagram for explaining an adhesive test for the conventional breather filter.

DETAILED DESCRIPTION OF THE PREFERRED EMBODIMENT

An example of applying a disk drive apparatus of the present invention to a hard disk drive (HDD) 1 will hereinafter be described with reference to the drawings. In the HDD 1, the top opening of an aluminum alloy base 2 in the form of a shallow box is sealed with a top cover 3, as illustrated in FIGS. 1 and 2. The base 2 and the top cover 3 constitute a disk enclosure 4.

A gasket 5 is stuck on the lower surface of the top cover 3. The gasket 5 is constructed, for example, with fluorine-contained rubber. The top cover 3 is screwed to the base 2 through the gasket 5 so that the disk enclosure 4 is hermetically sealed. Within this disk enclosure 4, a spindle motor 6 of a hub-in structure is provided at approximately the central portion of the base 2, as illustrated in FIG. 2. Magnetic disks 7, which consist of a glass or aluminum substrate, are stacked coaxially through spacers (not shown) and fixedly mounted on the upper surface of the hub (not shown) of the spindle motor 6 with a top clamp 8. The magnetic disks 7 are driven to rotate by the spindle motor 6.

In addition, an actuator 9 is provided within the disk enclosure 4. This actuator 9 has a magnetic head 10 for data reading and writing, at its one end is supported at its intermediate portion on the base 2 through a pivot shaft 11 so that it is free to rotate on the pivot shaft 11. The actuator 9 is provided at the other end thereof with a voice coil motor (VCM) coil and is rotated by a VCM 12, provided within the disk enclosure 4, which cooperates with the VCM coil.

A card (not shown) as a circuit board is attached on the exterior surface (lower surface) of the base 2. This card is formed into a rectangular shape so that it covers half of the exterior surface of the base 2. Input and output of electric power, signals, etc., for driving motors, are performed between the card and the spindle motor 6. In addition, input and output of electric power and signals, for power to the VCM coil and the read and write operations to be performed by the magnetic head 10, are performed between the card and the actuator 9. The input and output, between the card and the actuator 9, are performed via a flexible cable (FPC).

The HDD 1 of this embodiment is a disk drive apparatus called a head loading-unloading type. The head loading-unloading type HDD 1 is used for holding the actuator 9 at a ramp block 13 when not operated. During operation, the actuator 9 is driven so that the magnetic head 10 is moved from the ramp block 13 toward the magnetic disk 7 and located over a desired track on the magnetic disk 7.

The base 2 has a circumferential wall 2a extending upward from the circumference thereof. The base 2 is divided into a plurality of regions. That is, the regions surrounded by the circumferential wall 2a include a disk housing chamber 2b, which serves as a medium housing chamber for housing a disk assembly consisting of the magnetic disk 7 and the spindle motor 6 for rotating the magnetic disk 7, and an actuator housing chamber 2c for housing the actuator mechanism for locating the magnetic head 10 over the magnetic disk 7.

The gasket 5 is stuck on the lower surface of the top cover 3 so that the HDD 1 is sealed against the outside. In addition, a breather filter 14 is fixed to the top cover 3. This embodiment has characteristics in the structure of the breather filter 14 and the method for fixing the breather filter 14 to the top cover 3. The characteristics of this embodiment will hereinafter be described in detail.

FIG. 3 is an exploded perspective view of the breather filter 14. As illustrated in the figure, the breather filter 14 is constructed mainly of a filter case 15, a filter main body 16 to be housed in the filter case 15, and an air vent film 17 for covering the upper surface of the filter main body 16. FIG. 4 shows the upper surface (FIG. 4A) and lower surface (FIG. 4B) of the filter case 15.

The filter case 15 is constructed of a circular bottom wall 15a, a circumferential wall 15b extending upward from the circumference of the bottom wall 15a, and a flange 15c formed on the circumference of the circumferential wall 15b. A circular-arc air vent groove 15a1, extending from the circumference of the circumferential wall 15b toward the center, is formed in the lower surface of the bottom wall 15a. Note that the upper surface of the bottom wall 15a in the filter case 15 refers to a lower surface in FIG. 3, while the lower surface means an upper surface in FIG. 3. An air vent hole 15a2 is formed at one end of the air vent groove 15a1 so that it penetrates the upper and lower surfaces of the bottom wall 15a.

Adhesive double-coated tape 18 is bonded on the lower surface of the bottom wall 15a of the filter case 15. Therefore, the air vent groove 15a1 forms a closed space between itself and the adhesive double-coated tape 18. However, since a through hole 18a is formed in the center of the adhesive double-coated tape 18, as shown in FIG. 3, a portion corresponding to this through hole 18a is in communication with the outside. In addition, because the air vent hole 15a2 is formed at one end of the air vent groove 15a1, as described previously, the air vent groove 15a1 communicates with the outside through this air vent hole 15a2.

The filter main body 16 is housed within the filter case 15. When this occurs, the filter main body 16 is bonded and fixed by the adhesive double-coated tape 18 bonded on the lower surface of the bottom wall 15a. Then, the air vent film 17 is stuck on the upper surface (in FIG. 3) of the filter main body 16. In this manner, the components are integrated into the breather filter 14.

FIGS. 5 and 6 are diagrams for explaining a method for attaching the breather filter 14 to the top cover 3. FIG. 5 is a part-perspective view showing how the breather filter 14 is attached to the top cover 3; FIG. 6 is a part-sectional view showing the breather filter 14 attached to the top cover 3.

As illustrated in FIGS. 5 and 6, a through hole 3a for attachment of the breather filter 14 is formed in the top cover 3. The through hole 3a has a chamfered portion 3b at its circumference. If the breather filter 14 is inserted into the through hole 3a of the top cover 3, the flange 15c of the filter case 15 is brought into contact with the chamfered portion 3b. Therefore, the flange 15c serves as a stopper pawl so that the breather filter 14 is supported mechanically on top cover 3 while being penetrated through the top cover 3. In this state, adhesive single-coated tape 19 with a through hole 19a formed at the center thereof is stuck on the breather filter 14 and the top cover 3 so that the breather filter 14 is fixed to the top cover 3. As will be clear from FIG. 6, a portion of the breather filter 14 is exposed outside the top cover 3, that is, the disk enclosure 4, while the remaining portion is disposed inside the disk enclosure 4, The adhesive single-coated tape 19 is stuck over the flange 15c and the circumference of the chamfered portion 3b so that the breather filter 14 is fixed to the top cover 3. When this occurs, the through hole 15a2 of the breather filter 14 is exposed to the outside by the through hole 19a of the adhesive single-coated tape 19.

When the air within the disk enclosure 4 expands, air will flow out to the outside through the following path. That is, the air within the disk enclosure 4 passes through the air vent film 17, the filter main body 16, the through hole 18a of the adhesive double-coated tape 18, the air vent groove 15a1, and the air vent hole 15a2 in the recited order and flows out to the outside. On the other hand, when the outside air flows into the disk enclosure 4 because of a fall in the temperature within the disk enclosure 4, the outside air passes through the air vent hole 15a2, the air vent groove 15a1, the through hole 18a of the adhesive double-coated tape 18, the filter main body 16, and the air vent film 17 in the recited order. Therefore, even if the entering air contains dust or an evaporated organic or inorganic substance, the entrance of dust into the disk enclosure 4 can be reduced to the degree that device performance is not affected, because the air passes through the filter main body 16 and air vent film 17 which have activated charcoal as their main component.

The HDD 1 according to this embodiment eliminates a special positioning operation when inserting the breather filter 14 into the through hole 3a of the top cover 3 to fix the breather filter 14 through the through hole 3a. The aforementioned conventional HDD requires an accurate positioning operation to ensure that the through hole 100a of the top cover 100 coincides with the air vent hole 103a3 of the breather filter 102, whereas in the present invention the lobar of the positioning operation is extremely reduced. In this embodiment, the conventional positioning operation becomes unnecessary, because a portion of the breather filter 14 is exposed outside the top cover 3.

In addition, in this embodiment, the fixation of the breather filter 14 to the top cover 3 is performed with the adhesive single-coated tape 19. If the adhesive strength between the adhesive agent and the tape base is enhanced, the adhesive single-coated tape 19 can prevent the residue of the adhesive agent on the breather filter 14 and the top cover 3 when removing the breather filter 14 from the top cover 3. Therefore, after the breather filter 14 has been removed from the top cover 3, the breather filter 14 can be reused without performing an operation of removing the adhesive agent. The breather filter 14 can be reused only by inserting the breather filter 14 into the through hole 3a of the top cover 3 and sticking the adhesive single-coated tape 19, so the operation is extremely easy.

The HDD 1 of this embodiment is constructed so that the breather filter 14 is held on the chamfered portion 3b of the top cover 3. There is no possibility that the breather filter 14 will fall into the disk enclosure 4, when the HDD 1 is constructed. On the other hand, the conventional HDD is constructed so that breather filter 102 is fixed to the lower surface of the top cover 100 by the adhesive double-coated tape 106. Therefore, it cannot be said that there is no possibility that the breather filter 102 will fall into the disk enclosure, when adhesion of the adhesive double-coated tape 106 is not perfect.

Furthermore, while the conventional breather filter 102 requires the air vent grooves 103a1 and 103a2 to be formed on both surfaces of the bottom wall 103a, the breather filter 14 according to this embodiment is satisfied if it is formed only the lower surface of the bottom wall 15a. Therefore, the filter case 15 can be easily manufactured. For example, in the case of manufacturing the filter case 15 with resin by injection molding, a metal mold for injection molding can be readily manufactured.

The HDD 1 according to this embodiment has the advantage that whether or not the breather filter 14 has been fixed appropriately to the top cover 3 can be grasped by measuring air pressure within the disk enclosure 4. This advantage will hereinafter be described with reference to the drawings.

FIG. 12 is a diagram showing the state in which whether or not the breather filter 14 has been hermetically attached to the top cover 3 is tested. Note that the base 2 and the top cover 3 are assumed to be hermetically sealed.

As illustrated by an arrow in FIG. 12, suction force is exerted on the breather filter 14. The air within the disk enclosure 4 flows out of the disk enclosure 4 through the breather filter 14, as shown by arrows. With the suction force exerted, the pressure within the disk enclosure 4 is measured by a pressure gauge 20.

Here, assume that when adhesion by the adhesive single-coated tape 19 is proper, the measured pressure within the disk enclosure 4 is P1. Also, assume that adhesion is insufficient because of dust 21 present between the adhesive single-coated tape 19 and the top cover 3. Since air flows from the outside into the disk enclosure 4, as shown by a solid line arrow in FIG. 12, the pressure within the disk enclosure 4 measured with the pressure gauge 20 becomes P2 differing from P1. Assuming the air pressure outside the disk enclosure 4 is P, a differential pressure between the pressure P and the pressure P2 becomes smaller than that between the pressure P and the pressure P1. Thus, in this embodiment, the pressure within the disk enclosure 4 varies between the case where adhesion by the adhesive single-coated tape 19 is appropriate and the case where it is inappropriate. Thus, whether or not the breather filter 14 has been attached appropriately to the top cover 3 can be checked by applying pressure within the disk enclosure 4 through the breather filter 14.

Because the breather filter 14 penetrates the top cover 3 and is attached to the top cover 3, a flow of air can occur from the attached portion in addition to the flow of air in and out of the disk enclosure 4 by the breather filter 14. This embodiment realizes the aforementioned detection by taking advantage of the flow of air that will occur at the attached portion. While it has been described that the pressure within the disk enclosure 4 is reduced by application of suction force, the same detection can be performed even by applying pressure to the disk enclosure 4. On the other hand, in the aforementioned conventional breather filter 102, whether or not the breather filter 102 has been appropriately fixed to the top cover 100 cannot be detected as this embodiment can detect.

FIG. 13 shows the state in which adhesion by the adhesive double-coated tape 106 in the conventional breather filter 102 is insufficient because of the presence of dust 21. Assume that as with this embodiment, suction force is applied to the breather filter 102, as shown by an arrow. The air within the disk enclosure passes through the breather filter 102 and flows to the outside. However, in the case where adhesion by the adhesive double-coated tape 106 is insufficient, the air not being passed through the breather filter 102 also flows to the outside, as indicated by a solid line arrow. Assume that the pressure at this time, measured with the pressure gauge 20, is P3.

Also, assume that pressure, measured when adhesion by the adhesive double-coated tape 106 is inappropriate, is P4. This pressure P4 is compared with the pressure P3 in the case where adhesion by the adhesive double-coated tape 106 is inappropriate. In the case where adhesion by the adhesive double-coated tape 106 is inappropriate, the air not being passed through the breather filter 102 also flows to the outside. This air is originally the air within the disk enclosure, so the pressure P3 is the same as the case where adhesion by the adhesive double-coated tape 106 is appropriate. That is, P3 equals P4. Therefore, in the conventional breather filter 102, a defect in the adhesion performed by the adhesive double-coated tape 106 cannot be detected even if pressure within the disk enclosure is measured.

While, in this embodiment, the HDD1 has been described as an example of the disk drive apparatus, the present invention is also applicable to disk drives apparatus other than HDD1 having a filter equivalent to the breather filter 14. In addition, although the breather filter 14 in this embodiment has been attached on the top cover 3 of the HDD 1, it may be attached on the base 2.

As has been described above, the present invention is capable of reducing the labor of a positioning operation required in attaching the breather filter to the top cover. The present invention is also capable of preventing the residue of an adhesive agent when removing the breather filter from the top cover.

While the invention has been shown or described in only some of its forms, it should be apparent to those skilled in the art that it is not so limited, but is susceptible to various changes without departing from the scope of the invention.

What is claimed is:

1. A disk drive apparatus, comprising:
   a rotatable disk medium which stores data;
   a rotatable actuator having a head which reads data from and writes data to the disk medium;
   an enclosure which houses,the disk medium and the actuator;
   a filter which is attached to the enclosure and allows air circulation between the outside and inside of the enclosure; wherein
   the enclosure has a through hole intended for attachment of the filter, and the filter is attached to the enclosure through the through hole; and wherein
   the enclosure has an exterior chamfered portion around a circumference of the through hole; and
   the filter has a flange that is complementary in shape to the chamfered portion; and
   the flange abuts the chamfered portion.

2. A disk drive apparatus of claim 1, wherein the filter is mounted to the enclosure with adhesive tape on a circumference of the flange and a portion of the enclosure circumscribing the chamfered portion.

3. A disk drive, comprising:

a media disk for storing data;

a spindle motor for spinning the magnetic disk;

a rotary actuator having a head for reading data from and writing data to the media disk, and a pivot for pivoting relative to the media disk and locating the head with respect to a desired track on the media disk;

a disk enclosure containing the media disk, the spindle motor, and the rotary actuator, the disk enclosure including a cover having a planar surface, a chamfered recess in an exterior of the planar surface having an inclined surface, and a through-hole in the inclined surface that is circumscribed by the chamfered recess;

an integrated breather filter having a main body with an air vent film on end and a stopper pawl on an opposite end, the stopper pawl having a planar surface on one side, an inclined surface on an opposite side, and a hole extending therethrough to the main body; and wherein the breather filter is mounted and secured to the cover with tape having a single coating of adhesive, such that the main body of the breather filter is located in the through-hole, the inclined surfaces of the chamfered recess and the stopper pawl directly engage and abut each other, and the planar surfaces of the cover and the stopper pawl are essentially flush with each other.

* * * * *